United States Patent [19]

Vermeulen et al.

[11] 3,961,032

[45] June 1, 1976

[54] METHOD FOR CLEANING GASES AND VAPORS

[75] Inventors: Jacobus Cornelis Vermeulen, Arnhem; Eric Jan Stuart, Heemskerk, both of Netherlands

[73] Assignee: Hoogovens Ijmuiden, B.V., Ijmuiden, Netherlands

[22] Filed: Dec. 11, 1974

[21] Appl. No.: 531,560

[30] Foreign Application Priority Data
Dec. 11, 1973   Netherlands........................ 7316907

[52] U.S. Cl................................ 423/210; 423/220; 423/215.5; 75/25; 75/60
[51] Int. Cl.²......................................... B01D 53/34
[58] Field of Search................ 423/210, 215.5, 220; 75/25, 60

[56] References Cited

UNITED STATES PATENTS

| 1,847,179 | 3/1932 | Genter | 75/25 |
| 2,692,815 | 10/1954 | Walter | 423/215.5 |
| 3,770,415 | 11/1973 | Carignani et al. | 75/25 |

*Primary Examiner*—Earl C. Thomas
*Attorney, Agent, or Firm*—Stevens, Davis, Miller & Mosher

[57] ABSTRACT

A method for preventing the formation of boiler scale from after treating gases produced in steel-making by adding to the wash water through which the gases pass a solution containing from 0.5 to 2% by weight HCl and from 100 to 150 grams $Fe^{++}$ ions per liter. The rate of addition of the solution being such that $H^+$ and $Fe^{++}$ ions are supplied to the water in constant amounts per unit time.

5 Claims, No Drawings

METHOD FOR CLEANING GASES AND VAPORS

This invention relates to a method of continuous treatment of CaO-carrying gas or vapour produced in steel-making.

The method is especially suitable for, but is not restricted to, the treatment of gas or vapour produced in the so-called LD, LDAC and OBM processes, in which pure oxygen is blown onto or through a bath of molten steel in a tiltable steel converter and lime or dolomite or other lime-containing mixtures are added to the bath.

In these known steel production processes there is obtained a periodically and greatly varying supply of gases and vapours which contain considerable quantities of CaO and $CO_2$. Furthermore the escaping gases and vapours contain large quantities of very fine iron dust, slag dust and/or iron oxide dust. Because pollution of the surroundings especially by the iron oxide produced is inadmissible, it is in general usual to place over the steel converter a suction hood, through which the escaping gases and vapours are exhausted to a gas-cleaning installation, in which the dust is washed from the gases by water.

A difficulty experienced in this treatment is that the lime and $CO_2$ which are carried by the gases and vapours give rise to the formation of boiler scale in the gascleaning installation. After a period of time the sedimentation of boiler-scale becomes so serious that the installation needs to be cleaned of sediment. This not only gives rise to substantial costs in the cleaning of ducts and apparatus, such as venturis, hydrocyclones, pumps etc., but it is also found that a fouled installation causes considerable problems in operation of the plant. For example, if in gas cleaning there is used a venturi washer which is connected to a fan, then the obstruction of the venturi by boiler scale will result in a reduction of the suction capacity. This in turn results in insufficient suction at the converter, incomplete combustion of the converter gases, poor suction from the steel plant and an inadmissibly high CO content in the final gas.

The formation of boiler scale can be prevented by adding acid to the washing water. If this is done using pure acids, such as HCl, careful process control is required in order to adapt the rate of addition of the acid continuously to the rate of supply of lime. Especially, because of the large changes in the supply rate of lime such a process would require complicated and expensive control and dosing systems. In this connection it is remarked that with a constant rate of addition of acid the installation would be corroded by the acid during periods when the rate of lime supply was less than the average, whereas boiler scale would still be formed during periods when the rate of lime supply was greater than corresponded to the rate of addition of acid.

According to the present invention, there is provided a method of continuous treatment of CaO-carrying gas or vapour produced in steel-making by washing the gas or vapour with water, wherein the washing water is acidified by addition of a solution which contains from 0.5 to 2% by weight HCl and from 100 to 150 g. $Fe^{++}$ ions per liter, the rate of addition of the solution being such that $H^+$ and $Fe^{++}$ ions are supplied to the water in constant amounts per unit time.

The most suitable rate of addition of the solution of HCl and $Fe^{++}$ ions can be determined by calculation or empirically for each case. Preferably, the said amounts of $H^+$ and $Fe^{++}$ supplied per unit time are selected in dependence upon the time-averaged rate of supply to the water of $OH^-$ ions derived from the $Ca(OH)_2$ which is dissolved in the water.

The $Fe^{++}$ ions added to the washing water react with $OH^-$ ions, thus forming $Fe(OH)_2$. A buffering action thus results from the supply of the solution. Preferably the pH of the washing water is not allowed to fall below a minimum value of pH6. In this way a process of gas cleaning can be obtained which reduces or even eliminates the known disadvantages, without introducing an extra pollution problem.

It has been found possible when employing the invention to increase the acidity of the washing water by a sufficient amount that no boiler scale is formed, but nevertheless to keep the acidity sufficiently low that no substantial corrosion of the installation can result.

Best results have been obtained by using a solution containing from 0.5 to 1% free HCl. A very useful solution is almost spent pickling acid which has been used in pickling lines for pickling hot-rolled steel strip with HCl. Such pickling lines are commonly to be found together with hot-rolling and cold-rolling mills for strip, which themselves are often combined with steel making plant. In this way there is obtained a sensible use for a refuse product which otherwise could cause serious pollution problems in the disposal of it. A typical spent pickling acid solution contains for instance ½% by weight free HCl and 130 g. $Fe^{++}$/liter.

A further advantage may be obtained if the iron oxide sludge resulting from the washing process by the precipitation of the $Fe(OH)_2$ is, after having been dried, fed either directly or indirectly to a reduction furnace. Processes are known for drying washed out iron oxide sludge and subsequently feeding it to sintering or pelletizing installations, in order to obtain a product to be used as a burden for a blast furnace. The iron oxide sludge that forms anew during the gas cleaning treatment of the present invention can follow the same route, thus recirculating the iron from the spent pickling acid in the production cycle.

What we claim is:

1. Method of continuous treatment of CaO-carrying gas or vapour produced in steel-making by washing the gas or vapour with water, wherein the washing water is acidified by addition of a solution which contains from 0.5 to 2% by weight HCl and from 100 to 150 g. $Fe^{++}$ ions per liter, the rate of addition of the solution being such that $H^+$ and $Fe^{++}$ ions are supplied to the water in constant amounts per unit time.

2. Method according to claim 1 wherein the said amounts of $H^+$ and $Fe^{++}$ supplied per unit time are selected in dependence upon the time-averaged rate of supply to the water of $OH^-$ ions derived from the $Ca(OH)_2$ which is dissolved in the water.

3. Method according to claim 1 wherein the said solution contains from 0.5 to 1% by weight free HCl.

4. Method according to claim 1 wherein the said solution is, or is derived from, pickling acid which has been used for pickling hot-rolled steel strip with HCl.

5. Method according to claim 1 wherein the iron oxide sludge resulting from the washing is dried and supplied directly or indirectly to a reduction furnace.

* * * * *